Jan. 29, 1952 W. GERSTENBERGER 2,583,828
AUTOMATIC BUNGEE

Filed Jan. 4, 1949 3 Sheets-Sheet 1

WALTER GERSTENBERGER
INVENTOR

BY M. B. Tasker
ATTORNEY

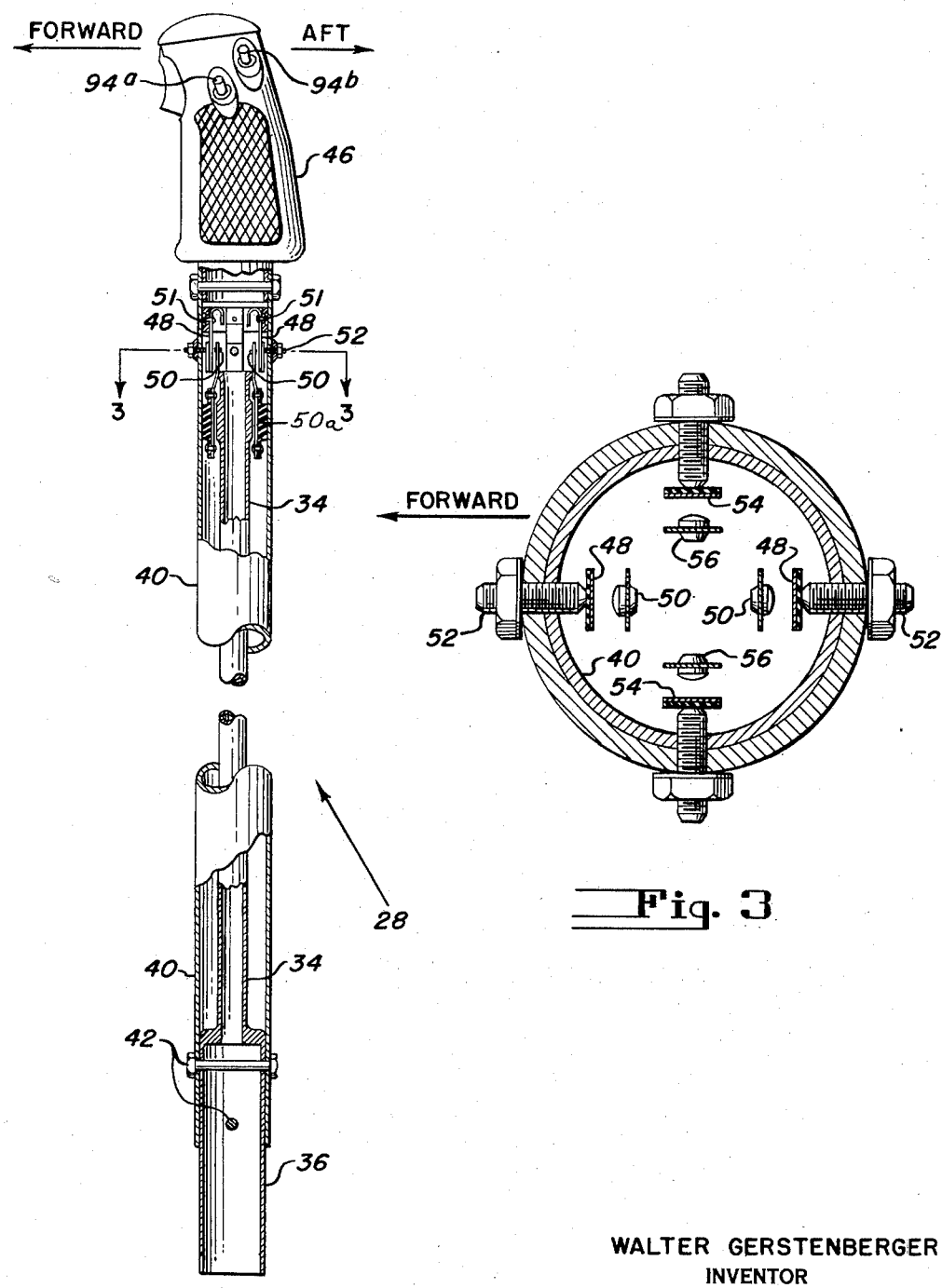

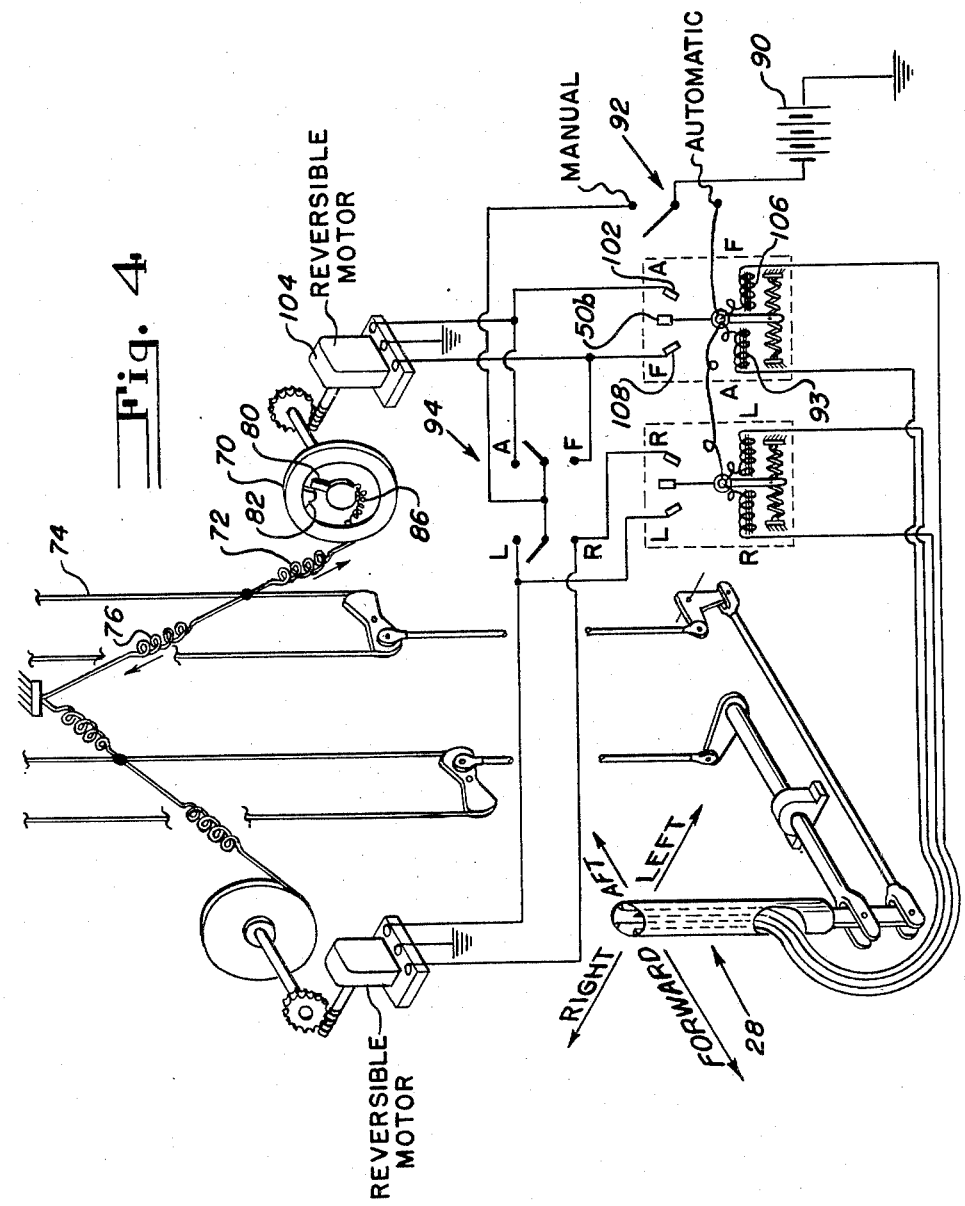

Patented Jan. 29, 1952

2,583,828

UNITED STATES PATENT OFFICE 2,583,828

AUTOMATIC BUNGEE

Walter Gerstenberger, Stratford, Conn., assignor to United Aircraft Corporation, East Hartford, Conn., a corporation of Delaware Application January 4, 1949, Serial No. 69,135

7 Claims. (Cl. 244—17.11)

This invention relates to direct lift aircraft such as helicopters and the like and more specifically relates to trim mechanisms for such aircraft so as to maintain a given flight attitude and permit the pilot to fly with very light pressures on the controls.

As in other conventional aircraft, direct lift airplanes are subject to center of gravity movement due to variations in load distribution and fuel consumption during flight and also due to various aerodynamic unbalances. Therefore it is necessary that a means be provided to properly trim the aircraft so that the pilot is relieved of continuously maintaining pressure on the controls during extended flights.

It is an object of this invention then to provide a trimming device for helicopters wherein proper trimming loads can be automatically or manually applied within the aircraft directional control system during flight.

A further object of this invention is to provide a trimming device for helicopter controls whereby forces on the pilot's control stick can be manually or automatically reduced to zero so that a given flight attitude can be maintained without continuous pressure necessarily being applied to the control stick.

Another object of this invention is to provide a trimming mechanism of the type described wherein trim forces can be selectively supplied either automatically in response to forces on the pilot's control stick or manually in accordance with the pilot's need; these trimming forces being available both for lateral and longitudinal control.

A still further object of this invention is to provide a control stick which responds to loads applied thereto in order to energize a power loading mechanism which in turn imparts sufficient forces on the control system to substantially reduce the loads on the stick to zero.

These and other objects of this invention will become readily apparent from the following detailed description of the drawings wherein like reference numerals refer to like parts throughout.

In these drawings,

Fig. 2 is a sectional view of the control stick according to this invention indicating the cooperating members which energize the automatic trimming mechanism;

Fig. 3 is a cross sectional view taken through the line 3—3 of Fig. 2; and

Fig. 4 is a diagrammatic view of the automatic trim mechanism and its electrical counterparts indicating the trim mechanism for longitudinal and lateral control according to this invention.

Figure 1:
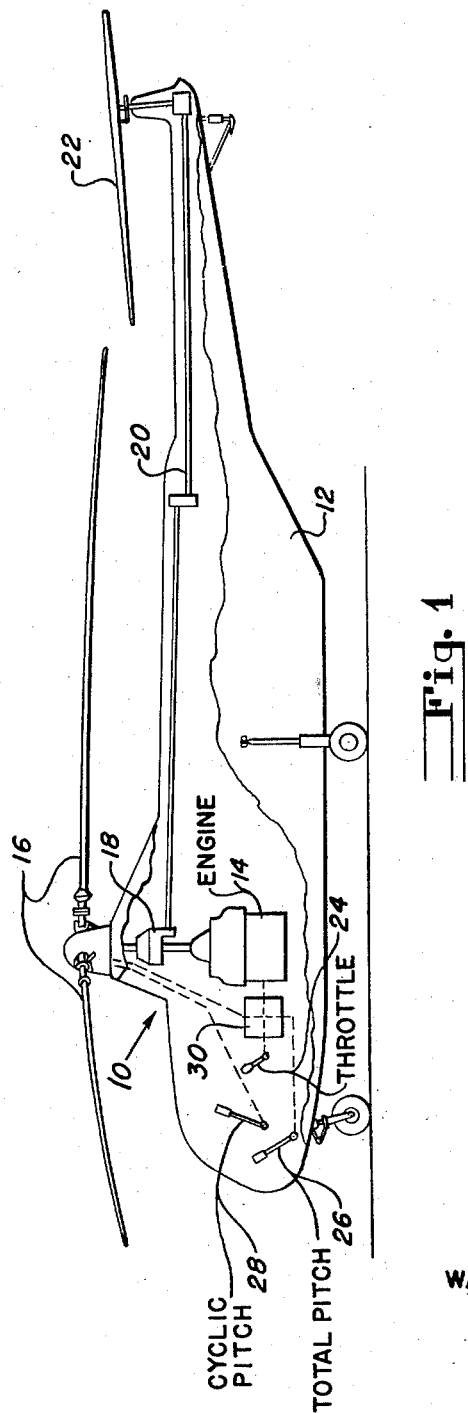
Fig. 1 is a side elevation of a helicopter indicating the control thereof schematically.

Referring to Fig. 1, a helicopter is generally indicated at 10 having a fuselage 12 and an engine 14 for driving variable pitch rotor blades 16. The usual transmission 18 is interposed between the engine and the rotor and includes a power take-off for driving an extension shaft 20 which in turn drives an auxiliary rotor 22.

The usual cockpit controls are provided including a throttle control 24, a total pitch control 26 and a cyclic pitch control 28. The throttle control 24 and the total pitch control 26 may be interconnected by a mixing mechanism 30 so as to provide for proper power variation from the engine as may be desired during either throttle movement or total pitch change. It may be further desirable to mount the throttle control 24 on the total pitch control 26.

As previously stated, conventional aircraft as well as helicopters are subject to variations in center of gravity and aerodynamic unbalances. Further there may exist certain instabilities in the controlling mechanism and the aerodynamic response thereto so that continuous control motions must be brought into play by the pilot in order to maintain a given flight attitude.

For example, in certain helicopters when the controls are moved forward to produce forward flight, the pilot must at some point anticipate the response of the aircraft and begin returning the stick toward neutral. In fact a certain amount of back pressure might necessarily be applied to prevent the helicopter from continuing its forward tilting displacement. Once the forward tilting has been stopped and the aircraft stabilized in a desired attitude of forward flight various blade twisting moments may still exist which tend to displace the controls and consequently the rotor blade tip plane path so as to cause the helicopter to be inclined. Since it is desirable to obtain an efficient forward flight attitude, for example, during cruising, it then becomes necessary for the pilot to continuously maintain a pressure on the stick to overcome these effects.

It is further obvious that any loading unbalance in aircraft of this type would require similar continuous attention to the controls thereby tending to exhaust the pilot during extended flight.

Also, where a reversible control system is utilized, i. e., a control system wherein forces can be transmitted from the pilot's control member to the rotor blades or where aerodynamic forces on the rotor blades can be transmitted back to the pilot's control member, various combinations of forces may impart loads to the pilot's control member so that continuous operation of the controls is necessary to maintain a given flight path. Hence it is necessary that some form of trimming device be provided so that the aircraft can easily and readily be stabilized in flight.

To this end the cyclic pitch control 28 (better seen in Fig. 2) consists of a substantially rigid core member 34 which has an enlarged base 36 adapted to be connected to the control cables of the cyclic pitch control system. An outer concentric and relatively flexible member 40 is rigidly mounted to the base 36 of the core 34 by one or more bolts 42 or other means. The upper end of the outer concentric member 40 carries the usual hand grip 46 adjacent which is mounted a plurality of spring type contact arms 48, these arms being located on the inner periphery of the outer flexible member 40 and in position to cooperate with electrical contact points 50 mounted on spring type arms which arms are engaged and moved by the uppermost end of the rigid core 34.

The arms bearing contact points 50 are held by a phenolic ring 50a which fits inside member 40. The top or free end of member 34 engages the arms bearing points 50 intermediate their fixed and free ends thereby multiplying the relative deflection between member 34 and member 40. The clearance between member 34 and the phenolic ring 50a establishes the maximum distance which 34 can move relative to 40. In this manner the motion of points 50 exaggerate the relative movement between 34 and 40 but cannot be deflected beyond that which is allowed by the clearance. This magnification of movement is necessary to prevent arcing across points 50 and the contact arms 48.

The arrangement of the contact arms 48 and the points 50 is better seen in Fig. 3. The contact arms 48 are rigidly held at their upper end to the outer member 40 (Fig. 2) by means of screws or rivets at 51. The free ends of these spring type contact arms 48 are adjustable transversely to the axis of the control stick by means of set screws 52 which are insulated from the arms 48 in the usual manner. The adjustment of screws 52 provides a variation of the load which is necessary to cause the points to engage and operate the bungee motor. For example, as 48 and 50 are spaced further apart, it will take a greater load on the control stick handle to cause the respective contacts to close. The contact arms 48 and the points 50 effect trimming for longitudinal control while the contact arms 54 and the points 56 effect lateral trimming in a manner which will become apparent hereinafter.

Thus it is apparent that in longitudinal control should any opposing loads be transmitted to the control stick assembly, the outer member 40 of the control stick assembly 28 will flex in relation to the grounded rigid core 34 thereby permitting one of the contact points 50 to come in contact with one of the contact arms 48 so that an electrical circuit would be completed therethrough.

As seen more clearly in Fig. 4 a reversible self-stopping electric motor is provided which upon being energized can rotate a cable drum 70 in either clockwise or counterclockwise direction. The cable drum 70 has wound thereabout one end of a spring type bungee 72 which has its other end interconnected to one of the control cables 74 of the fore and aft or longitudinal control mechanism. A fixed bungee 76 is also interconnected to the control cable 74 and imposes a predetermined load on the cable 74 in a direction opposite to that of the variable bungee 72. Thus in the neutral position of the control stick 28 the control cable 74 will be pre-loaded to the extent necessary to permit maximum displacement of the fore and aft control system and still maintain some load thereon. In other words, when all of the tension is released from the variable bungee 72 the fixed bungee 76 will have just expended all its potential energy.

A dog 80 is driven by the reversible motor shaft which dog engages a lip 82 on the drum 70. A relatively light biasing spring 86 which in actual practice may be of the rat-trap type insures against slackening of the bungee 72 relative to the drum 70 when the trim control is operated to produce minimum tension on the variable bungee 72.

The electrical system for the operation of the reversible motor as shown in the simplified diagram in Fig. 4 consists of a battery 90 which supplies electrical energy via the selector switch 92 to either the movable contact 50b which is moved by the solenoid 93 upon energization thereof through grounding points 50 in the control stick or to the manual trim switch 94 within the cockpit.

Thus it is obvious when the selector switch is in the automatic position, electrical energy is supplied to the contact points 48 located on the flexible member 40 of the control stick assembly 28 so that during flight, in the event that a steady pressure becomes necessary to maintain a given flight attitude, the outer member 40 of the control stick 28 will be deflected so that one of the energized arms 48 will be moved into contact with one of the grounded points 50 to complete the circuit of either relay coil 93 or 106 so as to energize the reversible motor and rotate the drum 70 either clockwise or counterclockwise. For example, as shown by the arrows in Fig. 4, should it be necessary to hold the control stick 28 aft the movable spring centered contact 50b would be moved into contact with point 108 by the solenoid 106 to energize the reversible motor 104 thereby causing the drum 70 to rotate counterclockwise and to increase the tension in the variable bungee 72. In turn a force will be applied to the control cable 74 sufficient to maintain the aircraft in the desired attitude so that no additional pressure will be required on the control stick 28. As soon as the variable bungee 72 has imposed the necessary force on the control cable 74, thereby relieving the pressure on the stick 28, the outer member 40 of the control stick will no longer deflect in relation to the core 34 and the contact between the arm 48 and the points 50 in the stick assembly will be broken.

In the event that forward pressure is required on the stick 28 the electrical connections will be so as to reversibly energize the motor via the solenoid 93 and point 102 and rotate the drum 70 clockwise. This clockwise rotation of the drum 70 decreases the tension in the variable bungee 72 to a point where the fixed bungee 76 will exert a necessary force on the control cable 74 in the opposite direction. It should be noted that since the fixed bungee 76 imposed a predetermined load in the system it is also possible for the drum 70 to control the amount of force applied by the fixed bungee 76 in a direction opposite from that of the variable bungee 72.

It is obvious that similar operating characteristics are available for lateral control inasmuch as an identical electrical mechanism is provided therefor. For convenience, then, the lateral trim control operation is omitted.

With the selector switch 92 in the manual position it is apparent that current may flow to the manual trim switch 94 so that the pilot may at will energize the reversible motor 104 in either direction so as to impose the desired load on the control cable 74 and thereby manually trim the airplane in a longitudinal direction. It may be desirable to replace the trim switch 94 with four individual spring loaded switches or microswitches so that either the motor for the longitudinal trim or the motor for the lateral trim can be energized in a push button fashion to impose the desired loads in the control system to neutralize inherent stick forces. Also, it may be desirable to place such manual trim switches on the grip 46 of the control stick to permit instantaneous manual control during flight without it being necessary for the pilot to move his hand from the stick during the trimming operation. Two of such switches, 94a and 94b appear in Fig. 2, the other two switches being omitted for convenience.

As a result of this invention an improved mechanism has been provided whereby a helicopter or the like can be manually or automatically trimmed during flight so as to reduce the strain on the pilot.

Also, as a result of this invention an improved trimming mechanism has been provided in conjunction with an automatic switch device carried by the control stick.

Further, a trim mechanism has been provided which is adaptable for use in conventional aircraft or other control systems where various unbalances may be prevalent.

Although only a preferred embodiment of this invention has been shown and described herein, it will be obvious that various changes and modifications of the construction and arrangement of the parts can be made without departing from the scope of this novel concept.

What it is desired to secure by Letters Patent is:

1. In a helicopter having variable pitch rotor blades mounted thereon, means for cyclically varying the pitch of the blades to control the attitude of flight of said helicopter including a control system for longitudinally and laterally controlling the helicopter, a pilot control member operatively connected to said control system for individually and simultaneously controlling longitudinal and lateral directions of flight of said helicopter, a power operated trim mechanism including a unit for each of the operative control directions of said system, each of said units comprising a plurality of resilient members connected to said system for preloading the latter equally in opposite directions including, means for varying the loading in at least one of said resilient members to upset said equalized preloading, and means responsive to force opposing longitudinally and laterally stabilized flight of the helicopter for energizing said power operated mechanism including elements operatively connected to said control system and said trim mechanism.

2. A helicopter according to claim 1 wherein the means responsive to forces opposing longitudinally and laterally stabilized flight includes elements carried by said pilot control member for selectively energizing said power trim mechanism units.

3. In a helicopter having variable pitch rotor blades, a control system for cyclically varying the pitch of said blades to control the attitude of flight of said helicopter including a pilot operated control member having operative connections to said blades and movable in fore-and-aft and lateral directions, said connections being such that forces acting on said rotor tending to rotate said blades around their pitch changing axes are transmitted through said connections to said control member, trim mechanism including bungee means for each of the force-and-aft and lateral movements of said control member, each of said bungee means having one of its ends attached to fixed structure of the helicopter and having its other end connected to a movable member, and each of said bungee means also having a connection intermediate its ends to said control system, said bungee means and hence said control system in the neutral position of said control member being in a state of stressed equilibrium, and trim means responsive to loads transmitted to said control system which unbalance said bungee means for moving the movable member of the bungee means affected in a direction to change the stresses in said bungee means to compensate for said loads and restore equilibrium in said control system.

4. In a helicopter having variable pitch rotor blades, a control system for cyclically varying the pitch of said blades to control the attitude of flight of said helicopter including a pilot operated control member having operative connections to said blades and movable in fore-and-aft and lateral directions, said connections being such that forces acting on said rotor tending to rotate said blades around their pitch changing axes are transmitted back through said connections to said control member, trim mechanism for said control system including bungee means for each of the fore-and-aft and the lateral movements of said control member, each of said bungee means comprising two opposed bungees having their adjacent ends connected to some point in said control system, and having their remote ends connected to fixed structure of the aircraft and to a movable member respectively, said bungee means in the neutral position of said control member being in a state of stressed equilibrium, and trim means responsive to forces transmitted through said connections from said rotor which unblance said opposed bungees for moving one or both of said movable members in a direction to increase or decrease the stress in the bungee attached thereto as required to balance the opposed forces and restore the equilibrium of said control system.

5. In a helicopter having variable pitch rotor blades, a control system for cyclically varying the pitch of said blades to control the attitude of flight of said helicopter including a pilot operated control member movable in fore-and-aft and lateral directions and having operative connections to said blades, said connections being such that forces acting on said rotor tending to rotate said blades around their pitch changing axes are transmitted through said connections to said control member, trim mechanism including bungee means for each of the fore-and-aft and the lateral movements of said control member, each of said bungee means having one of its ends attached to fixed structure of the helicopter and having its other end connected to a movable member, and each of said bungee means also having a connection intermediate its ends to said control system, said bungee means in the neutral position of said control member being in a state of stressed equilibrium, and trim means responsive to movement of said control member to unbalance said bungee means for moving the movable member of the bungee means affected in a direction to again bring said bungee means into said state of equilibrium in the new position of said control member.

6. In a helicopter having variable pitch rotor blades, a control system for cyclically varying the pitch of said blades to control the attitude of flight of said helicopter including a pilot operated control member movable in fore-and-aft and lateral directions and having operative connections to said blades, said connections being such that forces acting on said blades are transmitted back through said connections to said control member, trim mechanism including a bungee means for each of the fore-and-aft and the lateral movements of said control member, each of said bungee means having one of its ends attached to fixed structure of the helicopter, having a connection intermediate its ends to said control system and having its other end connected to a movable member, said bungee means and hence said control system in the neutral position of said control member being in a state of stressed equilibrium, and means responsive to movement of said control member to unbalance said bungee means for moving the movable member of the bungee means affected in a direction to again bring said bungee means into equilibrium in the new position of said control member.

7. In a helicopter having variable pitch rotor blades, means for cyclically varying the pitch of said blades to control the attitude of flight of said helicopter including a control system for longitudinally and laterally controlling the helicopter, said control system including a pilot operated control member for individually and simultaneously controlling longitudinal and lateral directions of flight of said helicopter, a power operated trim mechanism including a power unit for each of the operative control directions of said system, each of said units comprising bungee means connected at one end to fixed structure of the helicopter, connected at its other end to a movable member and connected intermediate its ends to the system for preloading the latter equally in opposite directions, and trim means responsive to unbalance of said bungee means as a result of a load applied to said control system originating either in said control member or in said rotor for moving one or both of said movable members a distance necessary to again balance said bungee means in the existing position of said control member.

WALTER GERSTENBERGER.

REFERENCES CITED

The following references are of record in the file of this patent:

UNITED STATES PATENTS

| Number | Name | Date |
|---|---|---|
| 1,339,332 | Greenly | May 4, 1920 |
| 1,992,970 | Sperry | Mar. 5, 1935 |
| 2,405,188 | Campbell | Aug. 6, 1946 |
| 2,408,770 | Frische | Oct. 8, 1946 |
| 2,445,900 | Wisman | July 27, 1948 |

FOREIGN PATENTS

| Number | Country | Date |
|---|---|---|
| 572,494 | Great Britain | Oct. 10, 1945 |